United States Patent [19]
Simons

[11] 3,850,074
[45] Nov. 26, 1974

[54] VIBRATION-RESISTANT THREAD-FORMING SCREW

[75] Inventor: Leon Simons, New City, N.Y.

[73] Assignee: NL Industries, Inc., New York, N.Y.

[22] Filed: May 8, 1972

[21] Appl. No.: 251,023

Related U.S. Application Data

[63] Continuation-in-part of Ser. No. 54,716, July 14, 1970, abandoned, and a continuation-in-part of Ser. No. 07,280, Jan. 30, 1970, abandoned.

[52] U.S. Cl.................... 85/46, 10/10 R, 151/22
[51] Int. Cl............................................ F16b 39/30
[58] Field of Search .......... 85/46; 151/22; 10/10 R, 10/27 R, 152 R, 152 T

[56] References Cited
UNITED STATES PATENTS

| | | | |
|---|---|---|---|
| 2,352,982 | 7/1944 | Tomalis | 151/22 UX |
| 3,247,877 | 4/1966 | Evans | 151/22 |
| 3,248,747 | 5/1966 | Scott | 85/46 X |
| 3,258,797 | 7/1966 | Budd | 10/152 T |

FOREIGN PATENTS OR APPLICATIONS

| | | | |
|---|---|---|---|
| 210,236 | 7/1960 | Austria | 85/46 |

Primary Examiner—Ramon S. Britts
Attorney, Agent, or Firm—Fitzpatrick, Cella, Harper & Scinto

[57] ABSTRACT

A vibration-resistant, thread-forming screw. The screw has an elongated shank made of a solid, one-piece body and provided with an interior core portion which, in any plane normal to the shank axis, has a circular configuration. Integral with and projecting radially from this core portion are a plurality of lobes uniformly distributed circumferentially about the shank axis and extending along spirals which progress angularly about the shank axis in a direction opposite to the thread. Each lobe has, in the direction in which the screw is turned into a body, an elongated leading leg which progresses gradually away from the shank axis in the latter direction of turning and a relatively short trailing leg which returns abruptly toward the shank axis before joining the leading leg of the next lobe. A specially shaped die for forming the screw.

5 Claims, 6 Drawing Figures

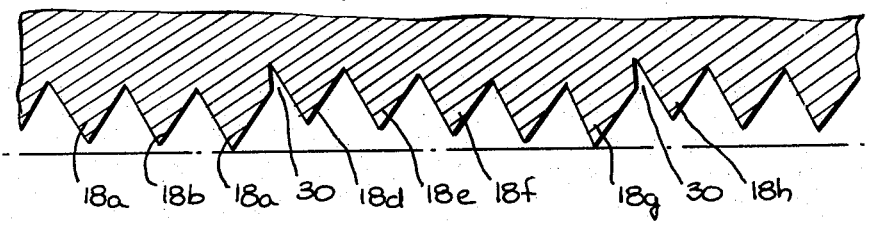
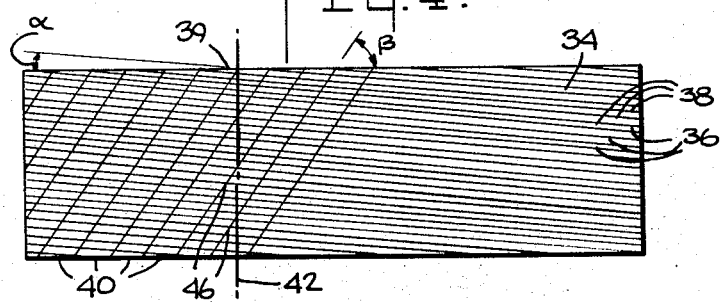
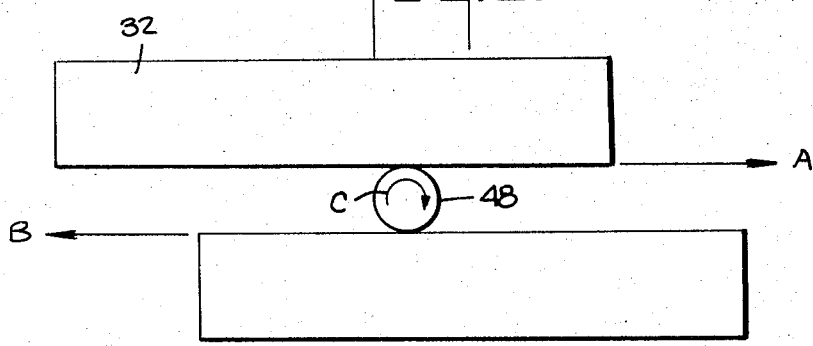
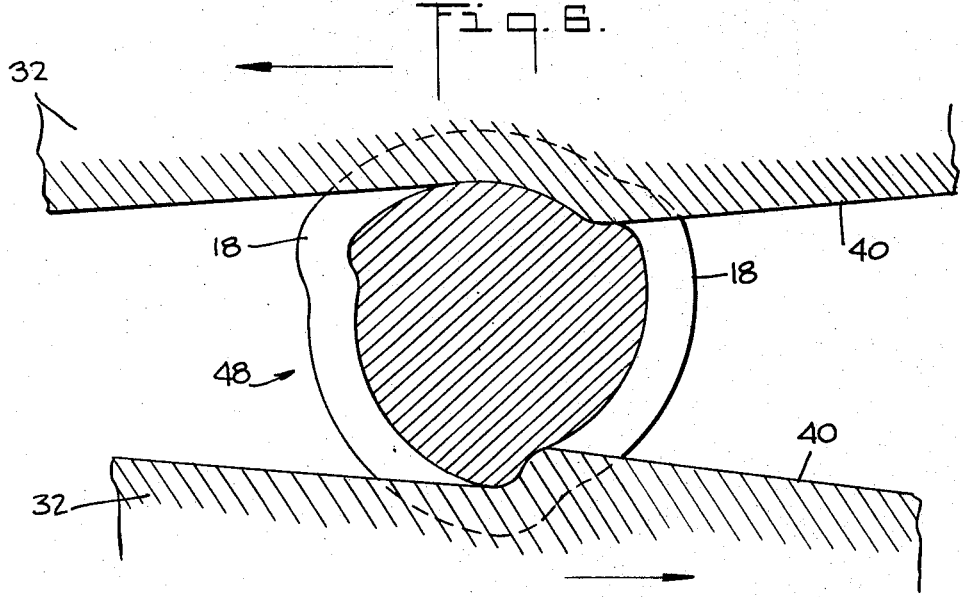

3,850,074

VIBRATION-RESISTANT THREAD-FORMING SCREW

This is a continuation-in-part of U.S. Pat. applications Ser. No. 54,716 filed July 14, 1970, now abandoned, and Ser. No. 007,280 filed Jan. 30, 1970 now abandoned.

BACKGROUND OF THE INVENTION

The present invention relates to screws and the formation thereof; and it relates to dies for forming self-threading lobular screws.

In one particular, the present invention relates to vibration-resistant screws.

It is, of course, well known to design screws in such a way that they will resist vibrations and remain in the threaded bores into which they are turned. However, problems are encountered because such screws have shank portions which yieldably flex to a substantial degree because of the spring, yieldable nature of the structure. Because of this latter property, from which the characteristic of resistance to vibrations flows, it is difficult to achieve from such screws the additional capacity for efficiently forming a thread so that the screws can be considered as self-tapping as well as vibration-resistant.

On the other hand, self-tapping screws which form their own threads as they are turned into a bore have relatively rigid shanks and threads so that the threads and the remainder of the shank will be able to withstand the excessive torque to which the screw is subjected during the thread-forming operation.

It has already been proposed to provide a vibration-resistant screw structure which is also self-tapping by giving the shank a lobular configuration. However, at the present time, screws of this latter type are still sufficiently springy to yield undesirably under stress. Moreover, such screws are expensive to manufacture, requiring a plurality of operations in the manufacturing process.

A further difficulty is encountered in the formation of self-tapping screws having lobular thread formations in that certain lobular configurations do not lend themselves readily to formation by rolling between a pair of dies which move along in fixed parallel planes.

SUMMARY OF THE INVENTION

According to the present invention, there is provided a vibration-resistant screw which is also capable of forming its own thread while at the same time being capable of resisting the torque to which the screw is subjected during the thread-forming operations.

In addition, the present invention serves to provide a screw of the above type which, while being robust, at the same time can be manufactured very simply and inexpensively in a single operation.

Furthermore, the present invention serves to provide a screw shank structure which will enable the screw to form a thread when the screw is turned into a body with minimal torque requirements.

Furthermore, the present invention serves to provide a screw of the above general type which functions more to displace the material of the body into which the screw is threaded while forming threads, as distinct from actually cutting the body, for achieving in the body which is formed with a thread by the screw of the invention, an engagement with the screw which will provide reliable resistance to pulling of the screw out of the body and which at the same time will achieve for the threaded bore which is formed in the body by the screw a minimal inner diameter.

Furthermore, the present invention serves to provide a screw which operates to form in the body of material into which the screw is threaded, a fuller thread formation to enhance the tightness and vibration-resistance of the screw in the body, and at the same time to provide clearance for unobstructed metal flow during threading so that threading torque is minimized.

Furthermore, the present invention, in one aspect thereof, provides novel arrangements for forming lobular threaded screws from round blanks.

Furthermore, the present invention, in another aspect thereof, provides novel die formations by which lobular self-tapping screws can be formed by rolling between dies in a smooth thread rolling operation.

Furthermore, the present invention provides novel methods for rolling self-tapping screw threads with lobular formations while the screw on which the threads of lobular configuration are being formed is automatically supported for smooth rolling movement between a pair of rolling dies, even though the lobular formations or lobes are non-symmetrical.

According to one aspect of the invention, there is provided a screw with a shank having an exterior thread formed along exterior non-symmetrical lobes distributed about the axis of the shank and progressing spirally there-along in an angular direction opposite to the thread. The shank has, in any plane normal to the shank axis, an inner core portion of circular cross-section with the lobes integrally projecting radially beyond the core. Each lobe is non-symmetrical in that it has, in the direction in which the screw is turned into a body, an elongated leading leg which progresses gradually away from the shank axis in the direction of turning in of the screw and a relatively short trailing leg which abruptly returns toward the axis of the shank before joining the leading leg of the next lobe. The thread depth is full and uniform throughout both the leading and trailing legs of each lobe.

The spiral arrangement of non-symmetrical lobes over which threads of full and uniform depth are formed provides a clearance for metal flow in an unobstructed manner so that threads of greater depth may be formed with a minimum of turning torque. This occurs because the highest point of each lobe, which causes maximum metal displacement, is immediately adjacent the lowest point of the next axially adjacent lobe, and the root of the lowest point of this next axially adjacent lobe being immediately contiguous with and considerably lower than the root of the lobe causing metal displacement, provides an unexpectedly large clearance to allow unobstructed metal flow for formation of maximum depth threads.

According to a further aspect of the present invention, both threads and lobes are formed on a screw shank in a single rolling operation. This permits the rolling of a screw shank of circular cross-section so that, following the rolling operation, the screw shank is not only threaded but the threads thereon follow lobular contours. Also according to this further aspect of the invention, because of the spiralled lobe arrangement, different portions of the different lobes along the screw length are formed at any one time during rolling. This permits a distribution of the lobe-forming pressures so that, during rolling, the overall rolling force remains substantially constant while the regions of maximum lobe-forming pressure shift axially along the length of the screw.

According to the present invention, there are also prvided novel thread rolling dies having thread-forming indentations in a working surface thereof. The indentations are undulated with respect to the plane of the working surface; and the undulations in the adjacent thread-forming indentations define a group of adjacent columns, each extending across the die at an acute angle with respect to the direction of relative die movement. In the illustrative embodiments, this angle is chosen to be sufficiently acute so that a line drawn along the working surface of the die perpendicular to its direction of movement from any location therealong will cross corresponding points along the undulations in at least two different columns. This novel thread rolling die configuration provides stable support during the formation of lobes and threads even though the lobes themselves may be of non-symmetrical contour.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

Specific embodiments of the invention have been chosen for purposes of illustration and description, and are shown in the accompanying drawings, forming a part of the specification, wherein:

BRIEF DESCRIPTION OF THE DRAWINGS

FIG. 3 is an enlarged fragmentary view taken along line 3—3 of FIG. 2;

FIG. 4 is a front elevational view of a thread rolling die according to the present invention;

FIG. 5 is a diagrammatic plan view illustrating thread rolling operation of thread dies as shown in FIG. 4; and FIG. 6 is an enlarged section view illustrating the action of die undulations in forming screw thread lobes according to the present invention.

DESCRIPTION OF PREFERRED EMBODIMENTS

Figure 1:
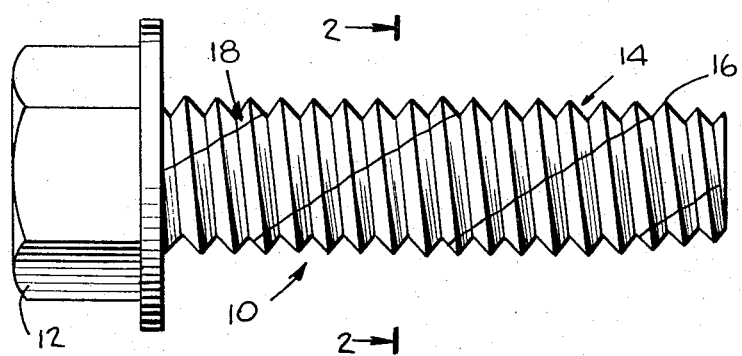
FIG. 1 is a side elevation of a screw of the invention.

Referring now to the drawing, it will be seen that the screw 10 of the present invention which is illustrated therein has a head 12 and an elongated shank 14. This shank 14 has an exterior thread 16. Also at its exterior, the shank has a plurality of lobes 18, shown on an enlarged scale in FIG. 2, and these lobes 18 are circumferentially distributed about the axis of the shank 14 and extend spirally therealong in an angular direction opposite from the thread 16, an apparent from FIG. 1.

Figure 2:
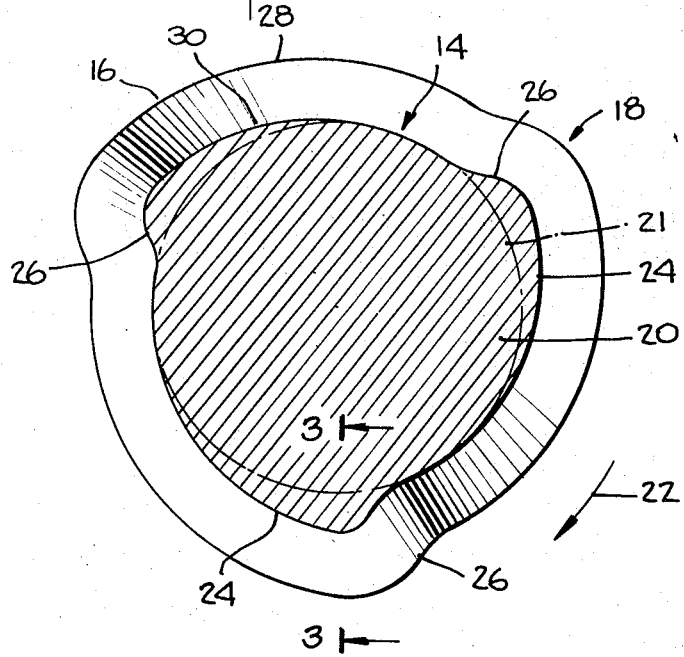
FIG. 2 is a somewhat schematic transverse section of the screw of FIG. 1 taken along line 2—2 of FIG. 1 in the direction of the arrows.

As may be seen from FIG. 2, in any plane which is normal to the shank axis, the shank has an inner core portion 20 which is of circular configuration and concentric with such axis, within the dot-dash line circle 21. The lobes 18 project radially from and are integral with the core portion 20, as is apparent from FIG. 2, and thus the core portion constitutes the central shank portion within the generated circle 21 coaxial with the shank axis.

When the screw is turned into a body, the screw is turned in the direction of the arrow 22 indicated in FIG. 2. It will be seen that in this turning direction 22, the lobes are non-symmetrical. That is, each lobe 18 has an elongated leading leg 24 which progresses gradually away from the axis of the shank in the direction of turning 22. Also, each lobe has a trailing leg 26 which abruptly returns inwardly toward the shank axis and which is much shorter than the longer leg 24. Each leg 24 is convexly curved and merges smoothly into the trailing leg 26 which is concave only at its innermost region where it adjoins the circular core portion 20 and the leading leg of the next lobe, as is apparent from FIG. 2. The progression of each leading leg 24 away from the axis of the shank is continuous, as shown in FIG. 2, from the beginning of the leading leg up to its merger with the abruptly returning trailing leg 26. Moreover, as may be seen from FIG. 2, the thread 16 has between its crest 28 and its root 30 a uniform radial width. Thus, the configuration of the lobes 18 at the crests 28 of the thread 16 matches with the configuration of the lobes along the thread root 30.

In practice, it has been found best to provide, in any plane normal to the shank axis, three lobes uniformly distributed about this axis with each lobe extending over an arc close to 120°, as is apparent from FIG. 2.

The above-described screw of the invention can simply and inexpensively be manufactured by using a thread roll-die, since the lobes are spiral, and the same pressure is used along the entire length of the screw, so that slippage in thread rolling is at a minimum. Moreover, roundness of the finished screw is maintained since there is no interruption in the rolling of the lobes, as would be the case if the lobes simply extended axially.

Thus, the screw is manufactured in one simple operation of rolling, simultaneously with the threading of the screw, as contrasted with various other thread-forming screws which must be made of pre-drawn trilobular wire headed by specially made trilobular heading dies and by various other specially shaped tools which are required to accommodate the trilobular blank.

Screws of the present invention have been found to perform well in a standard "pull-out" test. This is because the lobes are spirally situated and a high point of a lobe is always found at the exterior of the screw around the entire 360° of the shank, a pull-out will engage 360° of the mating member. Thus, much more force will be required to pull out the screw of the invention than any other type of lobular screw which has all of the lobes distributed axially along the shank.

After the screw of the invention has been used to form the thread in a hole of a body into which the screw is turned, since the lobes are situated so as to "wipe" in a thread and simultaneously form spirally a thread which is tapped in smoothly around 360° of ths shank, an especially low torque results.

Each lobe on the screw has the configuration described above where it gradually, yet continuously, rises out to its maximum distance from the shank axis and then abruptly drops back in toward the axis, before the gradual rise which forms the next lobe. Each lobe thus progresses gradually away from the shank axis in the direction in which the screw is turned into a body. When the screw is backed out of the threaded bore, the abrupt heel formed by the shorter leg of each lobe will offer resistantce to unscrewing, since the metal of the mating threaded part will tend to close in behind the heel or shorter leg of each lobe during formation of the thread.

Since the threads thus rise and fall according to the conformation of the lobes described above, it is possible to achieve the thread-forming operations in a much easier manner since a lower torque is required than would be the case with the use of, for example, three lobes each of which is of a symmetrical construction, as is encountered with other thread-forming screws.

Therefore, with the above-described screw of the invention, the starting torque is substantially lowered. It has also been found that for any given round hole into which the screw is tapped, a much fuller thread is formed. As is well known, thread-forming screws displace metal in the mating member so that the metal moves in both directions, moving to form both major and minor diameters. With the screw of the present invention, the effect is to displace metal to a greater degree, making for a smaller dimension of the major diameter in the part which is threaded. In other words, if a cylindrical plug gauge is inserted into the hole in which the thread has been formed by the screw of the invention, it will be found that a smaller plug gauge will be required to be inserted into the tapped hole than into any other tapped hole which has been thread-formed by a conventional screw. It follows, therefore, that with the screw of the invention, there is a much greater engagement with the threaded body and a much greater holding power.

Thus, the particular trilobular construction of the screw of the present invention allows the screw to form a thread. As is apparent from the above description, however, the thread-forming operations are greatly facilitated by the particular construction of the lobes referred to above. Inasmuch as the lobes are disposed about the shank axis in a spiral, the formation of the thread in a body into which the screw is turned is performed smoothly and without any interruption, thus further facilitating the thread-forming operation. Accordingly, the thread-forming screw is especially suitable to function as a tapping device and the definition thread-forming screw is intended to comprehend within its scope such tapping device having the characteristic lobular consturction aforedescribed.

The manner in which the spiralled lobal arrangement and thread configuration of the present invention operates to obtain fuller depth threads with minimal interference can best be seen in the fragmentary section view of FIG. 3. The section shown in FIG. 3 is taken along a plane which passes through the axis of the screw. Since the lobes 18 are spirally arranged about the circumference of the screw, the plane of the section of FIG. 3 cuts the lobes on adjacent threads along the length of the screw at a different location thereon.

Thus, whereas one lobe 18a is cut by the section plane at its highest point, successive lobes 18b, 18c, etc., on successively adjacent threads to the left of the one lobe 18a are cut at successively lower points along their respective gradually rising leading legs 28 (FIG. 2).

The lobe immediately to the right of the highest cut lobe 18a, i.e., lobe 18d, however, is cut by the section plane at its lowest point, so that the thread formation thereon is closer to the axis of the screw. This occurs because the trailing leg 26 (FIG. 2) of the lobes drops abruptly so that, with the lobes being spiralled, the lowest point on the lobe 18d is in axial alignment with the highest point on the lobe 18a.

Continuing along to the right in FIG. 3, it will be seen that the section plane cuts each successive lobe to the right of the lobe 18d, i.e., lobes 18e, 18f, etc., at successively higher points up to the highest point of a lobe 18g. The same section plane, however, cuts the next adjacent lobe, 18h, at its lowest point for the reason set forth above in connection with lobe 18d.

Now it will be noted from FIG. 3, that the threads on the screw maintain their full thread height and configuration at every location along each lobe irrespective of where the lobe is cut by the section plane. Because of this, it will be noted, in those situations where the highest point along one lobe is axially adjacent to the lowest point on another lobe, e.g., between lobes 18a and 18d and between lobes 18g and 18h, a clearance space 30 exists. This clearance space accommodates the flow of metal which is at a maximum in the region of the highest point of each lobe. This permits metal to flow unobstructedly in a manner which allows the formation of threads of maximum depth without the interference which usually accompanies swage-type thread-forming operations. The formation of full depth threads permits the screw to achieve maximum thread contact surface area so that the vibration-resistance of the screw is enhanced.

FIG. 4 shows a roll die 32 used to form the lobular screw threads described above. The roll die 32 comprises an essentially rectangular block of hardened metal having a working face 34 lying in the plane of the drawing. Alternate grooves 36 and ridges 38 are formed in the working face 34 and these grooves and ridges have a cross-sectional configuration corresponding in size and configuration to the cross-section of the thread to be formed. It will also be noted that the grooves 36 and the ridges 38 extend at an angle $\alpha$ with respect to an upper edge 39 or direction of relative movement of the die, this angle corresponding to the pitch angle of the thread to be rolled.

The thread-forming grooves 36 and ridges 38 follow undulations 40 in the plane of the working face 34 of the die. These undulations rise gradually up out of the plane of the working surface in a direction moving from right to left in the drawing and then they drop abruptly back into the working surface and begin a subsequent gradual rise. The undulations 40 in each groove 36 and ridge 38 are shifted slightly to the left with respect to the undulations 40 in the groove and ridge immediately thereabove. As a result, undulations 40 are arranged in columns which form an acute angle $\beta$ with respect to the upper edge 39 or direction of relative movement of the die 32. The angle $\beta$, which corresponds to the spiral pitch of the thread lobes formed by the die, is small enough so that along any imaginary line (e.g., phantom line 42) drawn perpendicular to the upper edge 39 of the die, at any location therealong, such line will be intersected by the highest points (e.g., points 44 and 46) of the undulations in two different columns.

In operation, two of the dies 32 are positioned with their working faces 34 parallel to each other and spaced apart, as shown in FIG. 5, by an amount sufficient to accommodate a shank 48 of a blank to be threaded and formed into the screw 10 of FIG. 1. The dies 32 are then moved in the planes of their working faces 34 in mutually opposite directions, as indicated by the arrows A and B in FIG. 5, so that the shank 48 is rotated clockwise, as indicated by the arrow C.

During the initial portion of the thread rolling operation, the non-undulated portions of the grooves 36 and ridges 38 in the dies 32 form threads about the shank 48 in conventional manner. Thereafter, however, the undulations 40 engage the shank 48 and these operate, as illustrated in FIG. 6, to form the lobes 18 in the screw threads.

Because the undulations 40 are formed at an angle $\beta$ with respect to the upper edge of the dies 32, or more particularly, with respect to the path of die movement, the shank 48 is engaged at all times by the highest points of at least two undulations 40 on the dies 32 at all times. Consequently, the dies support the shank in a stable manner and permit it to roll smoothly even though the dies are, during the rolling operation, imposing lobes on the screw.

In the present situation, the twisted or spiralled arrangement of the thread lobes permits them to be formed by rolling without the need for special arrangements for shifting the planes of the die element working surfaces. Also, with the present invention, it is possible to roll various lobular thread configurations without need for specially shaped screw blanks. In fact, circularly cross-sectioned screw blanks may be provided; and when these are rolled with dies according to the present invention, the blank axis remains stably supported equidistant between the two die surfaces.

By maintaining the blank axis in a fixed plane equidistant from the two die surfaces, the blank, when pretapered, may be formed with a point configuration having threads which are undistorted and which permit screw starting in previously drilled but untapped holes without need for excessive axial thrust on the screw.

It sill be understood that while the dies shown herein are flat, the principles of the present invention are applicable to curved dies between which elements to be threaded move along an arcuate path.

Having described the invention with particular reference to the preferred forms thereof, it will be obvious to those skilled in the art to which the invention pertains, after understanding the invention, that various changes and modifications may be made therein without departing from the spirit and scope of the invention, as defined by the claims appended hereto.

What is claimed is:

1. A one piece vibration-resistant, thread-forming screw comprising an elongated shank having a continuous exterior thread and a plurality of exterior lobes distributed circumferentially about said shank and extending spirally therealong in an angular direction opposite from said thread, said shank having in any plane normal to its axis an inner solid core portion of circular configuration and said lobes projecting outwardly beyond said core portion, being integral therewith, and being uniformly distributed circumferentially about said axis, each lobe having in the direction in which the shank is turned when threaded into a body a relatively long leading leg and a relatively short trailing leg, said leading leg continuing to progress gradually away from said core portion in said direction of turning out to a point of maximum distance from the shank axis where it meets its associated trailing leg which returns abruptly from said point toward said axis in said direction of turning of said shank into a body, each trailing leg being concave at its innermost region where it adjoins the circular core portion and forms a junction with the leading leg of the next lobe, said threads having crests and roots both conforming to the lobular configuration with said thread having a uniform radial dimension between its crest and root throughout the extent thereof, said point of maximum distance on each lobe being located substantially in axial alignment with a junction between two other immediately axially adjacent lobes.

2. A thread-forming screw according to claim 1, wherein there are three lobes uniformly distributed about the shank axis with each lobe extending angularly through approximately 120° about said axis.

3. A thread-forming screw according to claim 2, wherein the spirals along which said lobes progress along the shank axis oppositely to the thread have a pitch substantially greater than that of said thread.

4. A thread-forming screw according to claim 3, wherein a head is fixed to said shank at one end, and said shank terminating distant from said head in a tapering end portion.

5. A thread-forming screw according to claim 1, wherein said lobes follow a spiral which is of a pitch which results in the highest point of at least two axially separated lobes being in axial alignment at every location about the circumference of the screw whereby the lobed screw can roll smoothly along a plane surface on the highest points of successive lobes.

* * * * *